United States Patent [19]
Yamamoto

[11] Patent Number: 5,530,337
[45] Date of Patent: Jun. 25, 1996

[54] BATTERY CLUSTER CHARGER HAVING A BACKUP CHARGING SYSTEM

[75] Inventor: Yoshio Yamamoto, Tokyo, Japan

[73] Assignee: NEC Corporation, Tokyo, Japan

[21] Appl. No.: 447,035

[22] Filed: May 22, 1995

[30] Foreign Application Priority Data

Jun. 23, 1994 [JP] Japan .................................. 6-141386

[51] Int. Cl.⁶ .............................. H01M 10/46; H02J 7/00
[52] U.S. Cl. .................................. 320/6; 320/18; 320/56
[58] Field of Search .................................. 320/6, 12, 17,
320/18, 28, 29, 30, 31, 56; 307/18, 23, 65, 66

[56] References Cited

U.S. PATENT DOCUMENTS

| 3,305,754 | 2/1967 | Oaks et al. | 320/18 X |
| 3,389,303 | 6/1968 | Tenenbaum | 320/56 X |
| 3,803,568 | 4/1974 | Higashide | 307/65 X |
| 3,818,327 | 6/1974 | Straus | 307/18 X |

FOREIGN PATENT DOCUMENTS 56-110444  9/1981  Japan .

*Primary Examiner*—Peter S. Wong
*Assistant Examiner*—Edward Tso
*Attorney, Agent, or Firm*—Sughrue, Mion, Zinn, Macpeak & Seas

[57] ABSTRACT

A battery cluster charger has a plurality of charging circuits for charging a plurality of battery packs. When one of the charging circuits suffers a failure and cannot charge a corresponding battery pack, it is replaced with another of the charging circuits to charge the battery pack. The battery cluster charger includes a charging switcher for switching one of the charging circuits to charge the battery packs, a battery connection detector for detecting connections of the battery packs respectively to the charging circuits, and a control circuit responsive to a failure signal and a full-charge signal from each of the charging circuits, for controlling the charging switcher to stop charging one of the battery packs with one of the charging circuits which outputs the failure signal and to charge the battery packs with the other charging circuits until the fully-charge signals are outputted thereby.

6 Claims, 6 Drawing Sheets

BATTERY CLUSTER CHARGER HAVING A BACKUP CHARGING SYSTEM

BACKGROUND OF THE INVENTION

1. Field of the Invention

The present invention relates to a charger for charging a cluster of secondary batteries or battery packs, and more particularly to a battery cluster charger having a plurality of charging circuits which is capable of replacing any failing charging circuit with another charging circuit to charge a battery pack.

2. Description of the Related Art

One conventional battery cluster charger is shown in FIG. 1 of the accompanying drawings. As shown in FIG. 1, the conventional battery cluster charger includes charging circuits 102, 103 corresponding respectively to secondary batteries or battery packs 104, 105. When an AC power supply 101 is switched on, the charging circuits 102, 103 start charging the battery packs 104, 105, respectively. When the battery packs 104, 105 are fully charged, the charging circuits 102, 103 complete their charging cycles.

Therefore, the conventional battery cluster charger comprises a plurality of independently operable charging circuits that correspond respectively to battery packs to be charged thereby.

If any one of the charging circuits suffers a failure, the failing charging circuit stops its charging operation, and the corresponding battery pack is not charged thereby. Some battery packs for business use are charged at night and used on the next day. If the charging circuit for charging one of such battery packs has failed and the battery pack has not been charged at night, then the uncharged condition of the battery is not recognized until the user actually attempts to use it. Consequently, the failure of any one of the charging circuits poses problems in the actual use of the battery packs.

SUMMARY OF THE INVENTION

It is an object of the present invention to provide a battery cluster charger capable of charging a battery pack with another charging circuit in the event that the charging circuit originally assigned to charge the battery fails to operate.

According to the present invention, there is provided a battery cluster charger comprising a plurality of charging circuits for charging a plurality of battery packs, each of the charging circuits having means for outputting a failure signal upon a failure thereof and outputting a full-charge signal upon fully charging one of the battery packs, a battery connection detector for detecting connections of the battery packs respectively to the charging circuits, a charging switcher connected between the charging circuits and the battery packs connected respectively thereto, for switching to one of the charging circuits for charging the battery packs, and a control circuit responsive to the failure signal and the full-charge signal from each of the charging circuits, for controlling the charging switcher to stop charging one of the battery packs with one of the charging circuits which outputs the failure signal and to successively charge the battery packs with the other charging circuits until the fully-charge signals are outputted thereby.

According to the present invention, there is also provided a battery cluster charger comprising a pair of charging circuits for charging a pair of battery packs, each of the charging circuits having means for outputting a failure signal upon a failure thereof and outputting a full-charge signal upon fully charging one of the battery packs, a battery connection detector for detecting connections of the battery packs respectively to the charging circuits, a charging switcher connected between the charging circuits and the battery packs connected respectively thereto, for switching to one of the charging circuits for charging the battery packs, and a control circuit responsive to the failure signal and the full-charge signal from each of the charging circuits, for controlling the charging switcher to stop charging one of the battery packs with one of the charging circuits which outputs the failure signal and to successively charge the battery packs with the other charging circuit until the fully-charge signal is outputted thereby.

The charging switcher may comprise a first line connected between one of the charging circuits and the battery pack corresponding thereto, a first relay contact connected in the first line, a second line connected between the other of the charging circuits and the battery pack corresponding thereto, a second relay contact connected in the second line, a third line interconnecting the first line and the second line, and a third relay contact connected in the third line.

The control circuit may comprise means responsive to the failure signal from one of the charging circuits and the full-charge signal from the other charging circuits, for opening one of the first and second relay contacts which is connected to the other charging circuits, and closing the third relay contact upon elapse of a predetermined time after one of the first and second relay contacts is opened.

With the above arrangement, no battery pack is charged by any of the charging circuits which suffers a failure. Since the battery packs are successively charged by one of the normal charging circuits until a full-charge signal is outputted thereby, all the battery packs can be fully charged even though one of the charging circuits suffers a failure.

When the control circuit receives the failure signal from the failing charging circuit and the full-charge signals from the other charging circuits, the control circuit controls the charging switcher to switch from the failing charging circuit to one of the other charging circuits for charging the battery packs with the other charging circuit.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
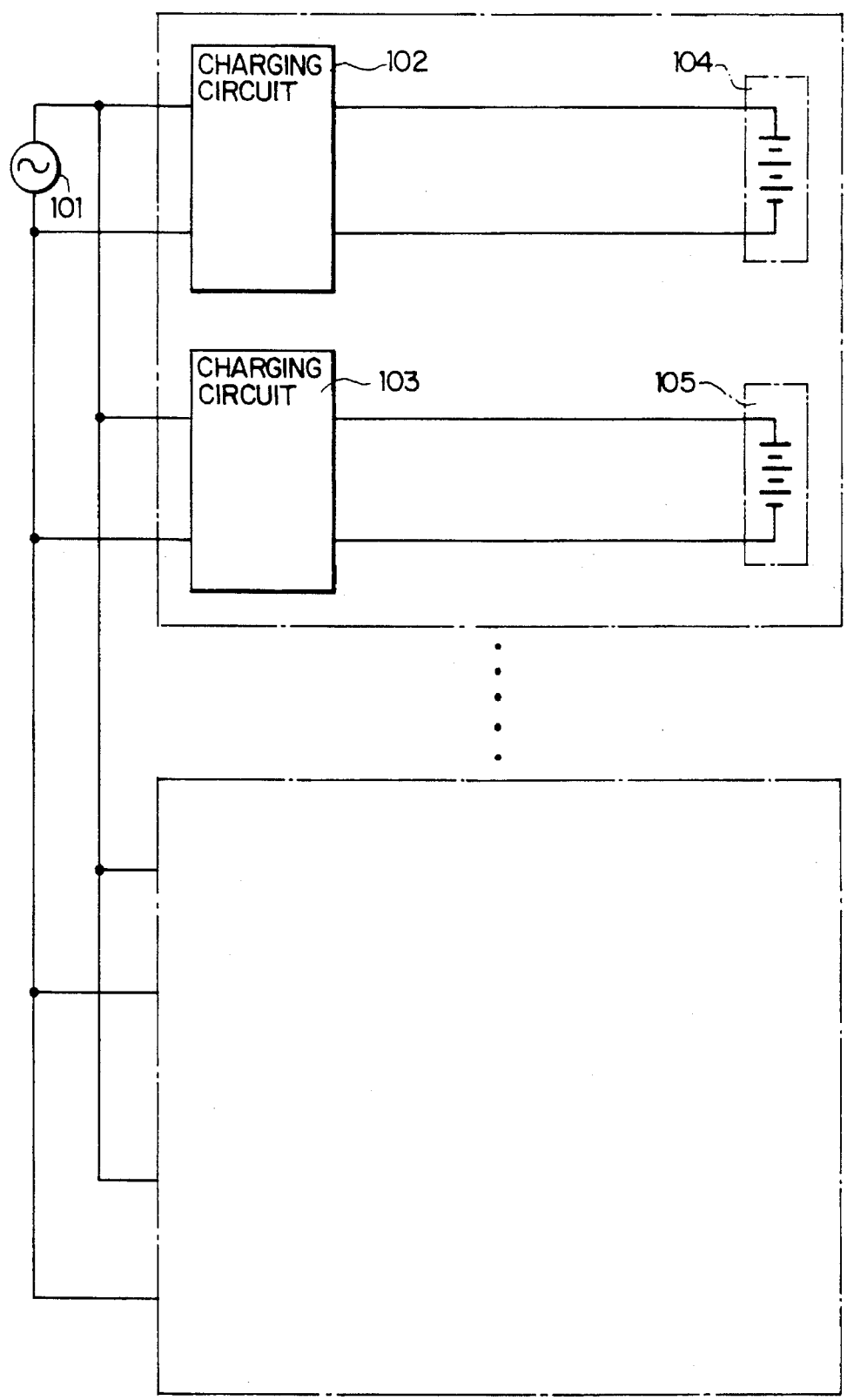
FIG. 1 is a block diagram of a conventional battery cluster charger.
Figure 2:
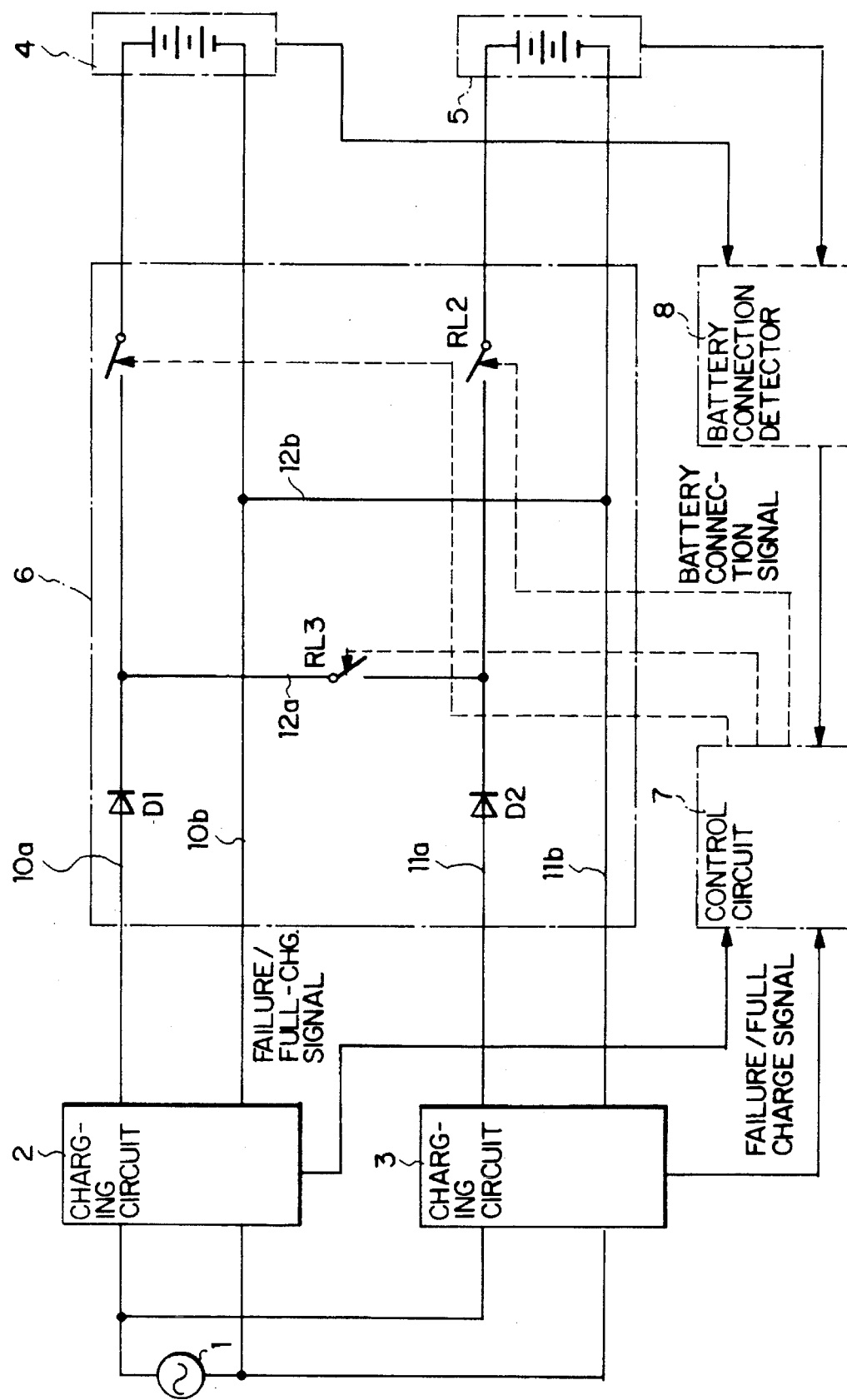
FIG. 2 is a block diagram of a battery cluster charger according to the present invention.

As shown in FIG. 2, a battery cluster charger according to the present invention comprises an AC power supply 1, a pair of charging circuits 2, 3, a pair of secondary batteries or battery packs 4, 5 corresponding respectively to the charging circuits 2, 3, a charging switcher 6 connected between the charging circuits 2, 3 and the battery packs 4, 5 for switching to a normal charging circuit when one of the charging circuits 2, 3 fails to operate, a battery connection detector 8 for detecting whether a battery pack is connected or not, and a control circuit 7 for controlling the charging switcher 6 based on a failure signal supplied from a failing charging circuit and a full-charge signal supplied from a normal charging circuit.

The charging switcher 6 comprises a pair of diodes D1, D2 and three relay contacts RL1, RL2, RL3. The diodes D1, D2 serve to prevent a current from flowing back to failing charging circuits. The diode D1 and the relay contact RL1 are connected in one 10a of two lines 10a, 10b between the charging circuit 2 and the battery pack 4, and the diode D2 and the relay contact RL2 are connected in one 11a of two lines 11a, 11b between the charging circuit 3 and the battery pack 5. The lines 10a, 11a are interconnected by a line 12a having the relay RL3, and the lines 10b, 11b are interconnected by a line 12b.

The relay contacts RL1, RL2, RL3 are controlled for their opening and closing by the control circuit 7.

Operation of the battery cluster charger shown in FIG. 2 will be described below.

Figure 3:
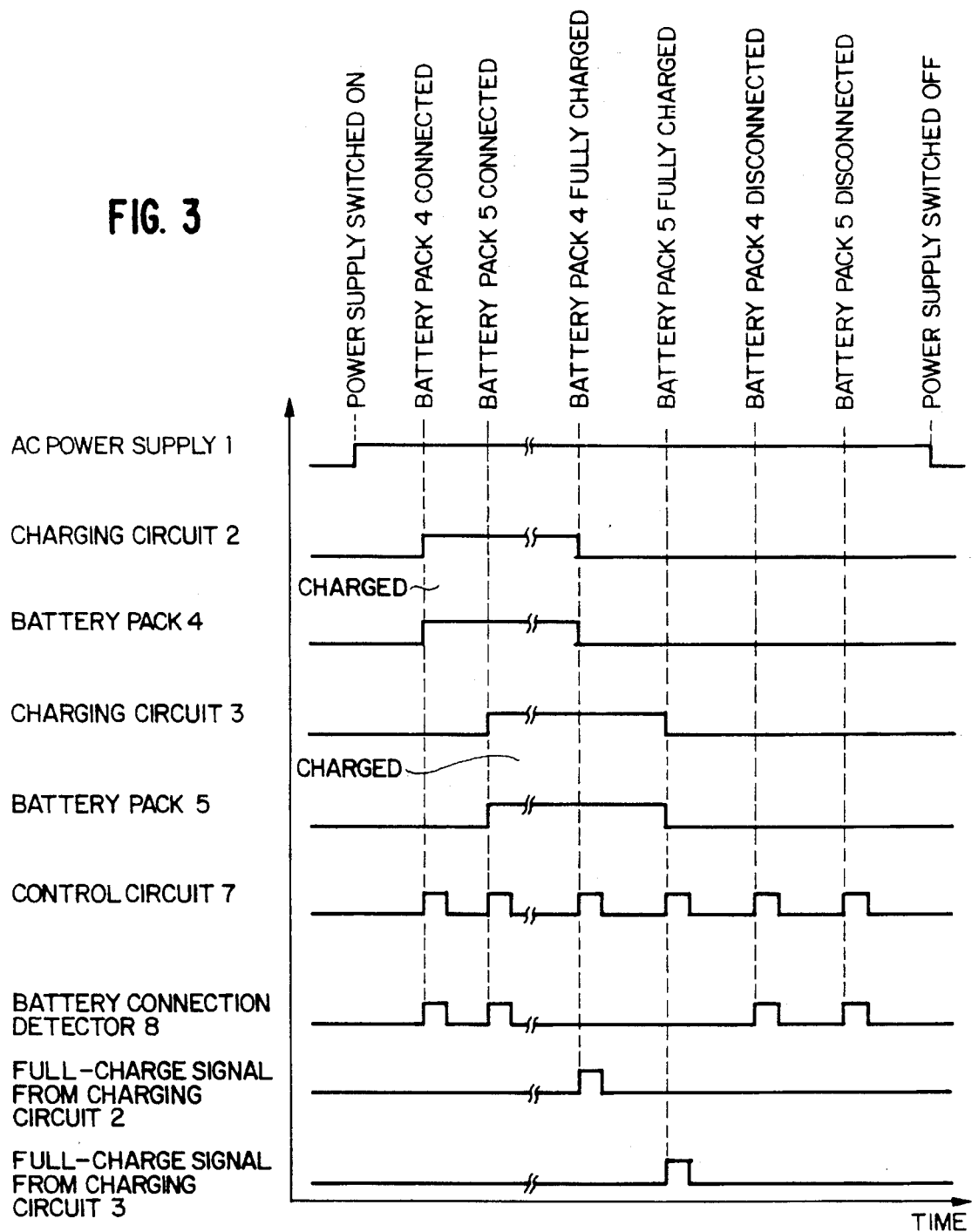
FIG. 3 is a timing chart of an operating sequence of the battery cluster charger according to the present invention at the time charging circuits operate normally.

First, an operating sequence of the battery cluster charger at the time the charging circuits 2, 3 operate normally will be described below with reference to FIG. 3.

When the AC power supply 1 is switched on, the charging circuits 2, 3 are armed until the battery packs 4, 5 are connected. When the battery pack 4 is connected, the charging circuit 2 starts charging the battery pack 4. When the battery pack 5 is connected, the charging circuit 3 starts charging the battery pack 5. The battery packs 4, 5 are charged by the corresponding charging circuits 2, 3 irrespective of the order in which the battery packs 4, 5 are connected. When the battery packs 4, 5 are connected, the battery connection detector 8 which monitors connections of the battery packs 4, 5 sends battery connection signals indicative of the connections of the battery packs 4, 5 to the control circuit 7.

When the battery pack 4 is fully charged, the charging circuit 2 supplies a full-charge signal indicating that the battery pack 4 is fully charged to the control circuit 7, and stops charging the battery pack 4. Similarly, when the battery pack 5 is fully charged, the charging circuit 3 supplies a full-charge signal indicating that the battery pack 5 is fully charged to the control circuit 7, and stops charging the battery pack 5. Times at which the battery packs 4, 5 are fully charged have no bearing on the operation of the battery cluster charger.

When the fully charged battery packs 4, 5 are disconnected from the battery cluster charger for subsequent use, the battery connection detector 8 detects the disconnections of the battery packs 4, 5, and sends signals indicating that no battery packs are connected to the control circuit 7. In response to the supplied signals, the control circuit 7 resets the battery cluster charger to its initial condition.

An operating sequence of the battery cluster charger at the time the battery packs 5, 4 are connected in the named order upon a failure of the charging circuit 2 will be described below with reference to FIG. 4.

If the charging circuit 2 fails to operate, then when the AC power supply 1 is switched on before the battery packs are connected, the charging circuit 2 sends a failure signal indicating its failure to the control circuit 7, which displays an alarm for the charging circuit 2. Usually, the battery pack 4 will not be connected because an alarm is displayed for the charging circuit 2. However, it is assumed here that the battery pack 4 is connected after the battery pack 5 is connected and starts being charged.

The battery pack 4 is not charged owing to the failure of the charging circuit 2. When the battery pack 5 is subsequently fully charged, the charging circuit 3 supplies a full-charge signal to the control circuit 7. In response to the full-charge signal from the charging circuit 3, the control circuit 7 detects the failure signal from the charging circuit 2 and the battery connection signal indicating that the battery pack 4 is connected from the battery connection detector 8, and opens the relay contact RL2. Upon elapse of "t" seconds from the opening of the relay contact RL2, the control circuit 7 closes the relay contact RL3, allowing the charging circuit 3 to start charging the battery pack 4.

The control circuit 7 closes the relay contact RL3 upon elapse of "t" seconds from the opening of the relay contact RL2 in order to prevent a discharging current from flowing from the fully charged battery pack 5 to the uncharged battery pack 4.

When the battery pack 4 is subsequently fully charged, the charging circuit 3 supplies a full-charge signal to the control circuit 7, and stops charging the battery pack 4. In response to the full-charge signal from the charging circuit 3, the control circuit 7 opens the relay contact RL3, and, after elapse of "t" seconds, closes the relay contact RL2. When the fully charged battery packs 4, 5 are disconnected from the battery cluster charger, the battery cluster charger is reset to the initial condition. However, the charging circuit 2 continuously sends the failure signal unless the AC power supply 1 is switched off.

An operating sequence of the battery cluster charger at the time the battery packs 4, 5 are connected in the named order upon a failure of the charging circuit 2 will be described below with reference to FIG. 5.

The operating sequence of the battery cluster charger shown in FIG. 5 differs from the operating sequence of the battery cluster charger shown in FIG. 4 as follows: When the battery pack 4 is first connected, the connection of the battery pack 4 is indicated to the control circuit 7 by the battery connection detector 8. If the battery pack 5 is not connected at this time, the control circuit 7 opens the relay contact RL2 and, after elapse of "t" seconds, closes the relay contact RL3, allowing the charging circuit 3 to start charging the battery pack 4. If the battery pack 5 is connected after the battery pack 4 starts being charged, then the control circuit 7 waits for the battery pack 4 to be fully charged, and then opens the relay contact RL3. Upon elapse of "t" seconds after the opening of the relay contact RL3, the control circuit 7 closes the relay contact RL2, allowing the charging circuit 3 to start charging the battery pack 5. Thereafter, the battery cluster charger operates in the same manner as it does in the sequence shown in FIG. 3.

Figure 6:
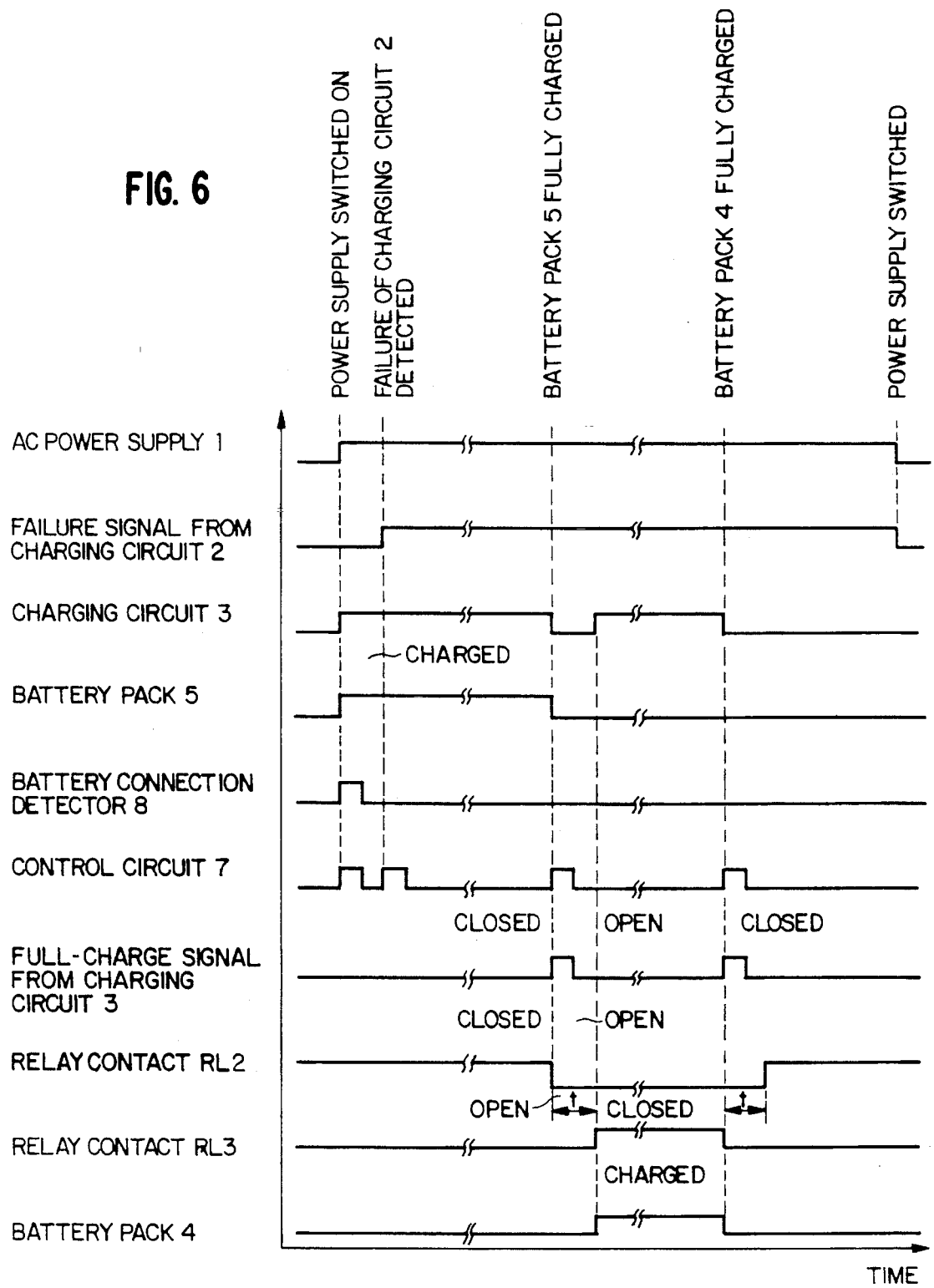
FIG. 6 is a timing chart of an operating sequence of the battery cluster charger at the time the charging circuit fails when a power supply is switched on after battery packs are connected.

FIG. 6 shows an operating sequence of the battery cluster charger upon a failure of the charging circuit 2 when the power supply 1 is switched on after the battery packs 4, 5 are connected. In the operating sequence shown in FIG. 6, as with the operating sequence shown in FIG. 4, the battery pack 5 first starts being charged, and after the battery pack 5 is fully charged, the battery cluster charger switches to the charging of the battery pack 4. Therefore, in the event of a failure of the charging circuit 2, it is reliably replaced by the other charging circuit 3 for charging the battery pack 4 until it is fully charged.

Figure 4:
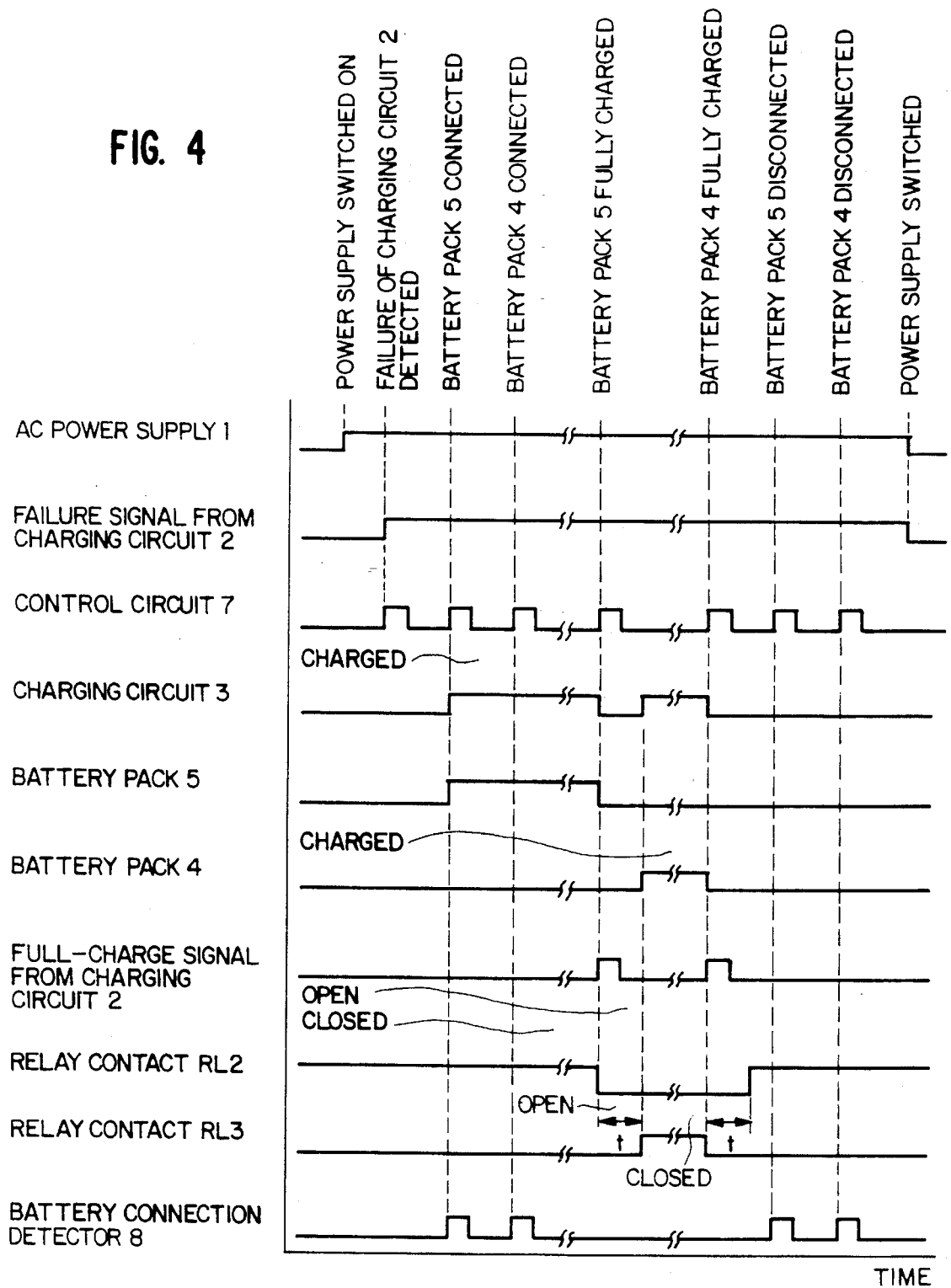
FIG. 4 is a timing chart of an operating sequence of the battery cluster charger at the time two battery packs are connected in one order upon a failure of a charging circuit.
Figure 5:
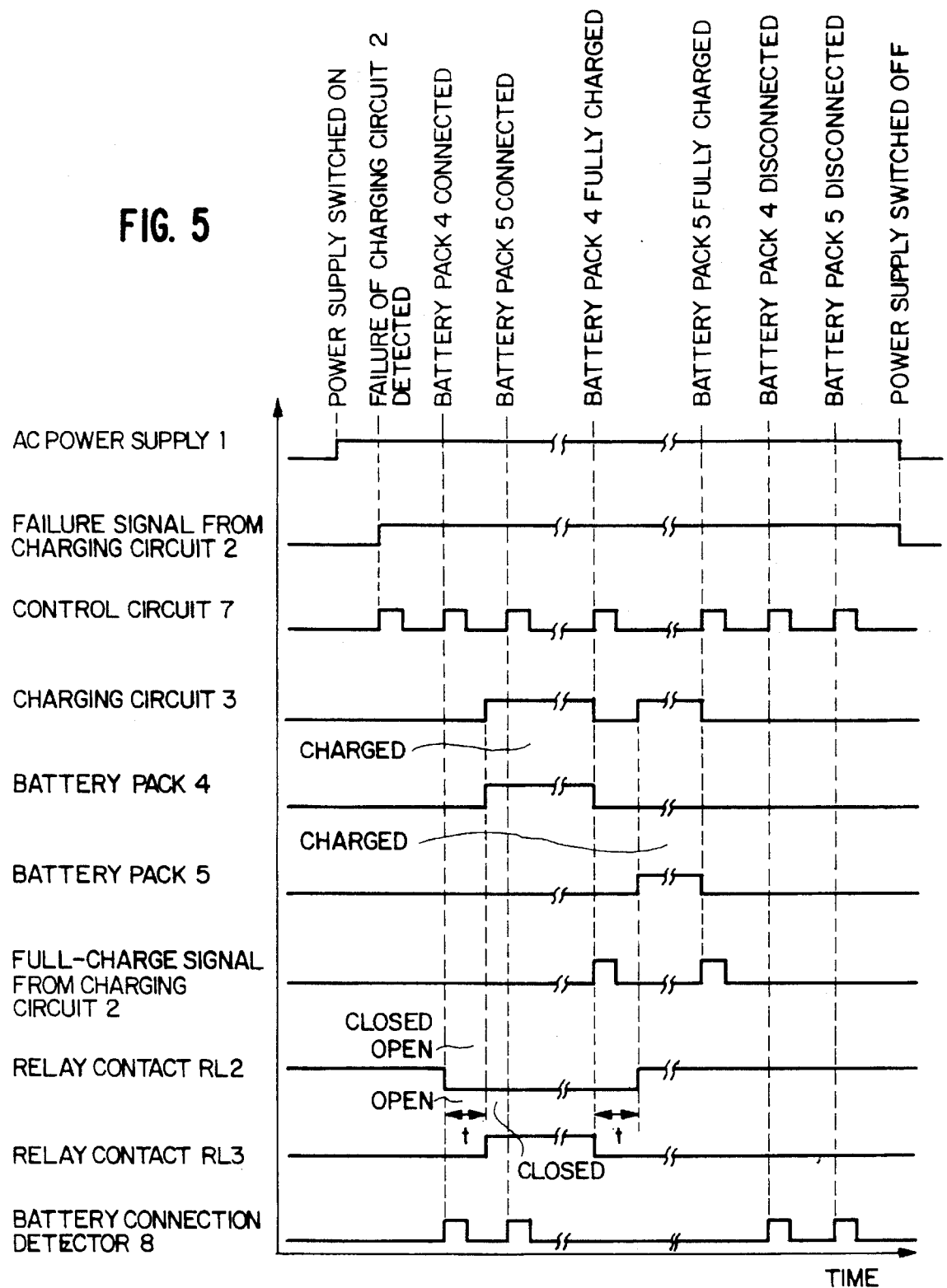
FIG. 5 is a timing chart of an operating sequence of the battery cluster charger at the time the two battery packs are connected in the opposite order upon a failure of the charging circuit.

All the operating sequences shown in FIGS. 4, 5, and 6 have been described with respect to the charging circuit switching capability of the battery cluster charger upon a failure of the charging circuit 2. However, it can readily be understood that the battery cluster charger operates in a similar manner when the charging circuit 3 suffers a failure.

In the illustrated embodiment, the battery cluster charger has been shown and described as having a pair of charging circuits. However, the battery cluster charger may have any desired number of charging circuits or any desired number of sets of charging circuits. Each of the sets of charging circuits is associated with a charging switcher for selecting any of the charging circuits for charging the battery packs, and a control circuit for controlling the charging switcher to stop charging the battery packs with a failing charging circuit and successively charge the battery packs with a normal charging circuit or circuits until a full-charge signal or signals are outputted. With this arrangement, all the connected battery packs can be fully charged even in the event of a failure of any one of the charging circuits in each of the sets. The charging switcher may be of a known circuit arrangement composed of a combination of diodes and relay contacts.

According to the present invention, as described above, upon a failure of any one of the charging circuits of the battery cluster charger, another charging circuit replaces the failing charging circuit to charge the battery packs through the charging switcher. Consequently, the user of the battery packs finds it convenient to charge the battery packs with the battery cluster charger and also feels assured about the use of the battery packs that have been charged by the battery cluster charger.

Although a certain preferred embodiment of the present invention has been shown and described in detail, it should be understood that various changes and modifications may be made therein without departing from the scope of the appended claims.

What is claimed is:

1. A battery cluster charger comprising:

a plurality of charging circuits for charging a plurality of battery packs;

each of said charging circuits having means for outputting a failure signal upon a failure thereof and outputting a full-charge signal upon fully charging one of the battery packs;

a battery connection detector for detecting connections of the battery packs respectively to the charging circuits;

a charging switcher connected between the charging circuits and the battery packs connected respectively thereto, for switching to one of the charging circuits for charging the battery packs; and a control circuit responsive to the failure signal and the full-charge signal from each of said charging circuits, for controlling said charging switcher to stop charging one of the battery packs with one of the charging circuits which outputs the failure signal and to successively charge the battery packs with the other charging circuits until the fully-charge signals are outputted thereby.

2. A battery cluster charger comprising:

a pair of charging circuits for charging a pair of battery packs;

each of said charging circuits having means for outputting a failure signal upon a failure thereof and outputting a full-charge signal upon fully charging one of the battery packs;

a battery connection detector for detecting connections of the battery packs respectively to the charging circuits;

a charging switcher connected between the charging circuits and the battery packs connected respectively thereto, for switching to one of the charging circuits for charging the battery packs; and a control circuit responsive to the failure signal and the full-charge signal from each of said charging circuits, for controlling said charging switcher to stop charging one of the battery packs with one of the charging circuits which outputs the failure signal and to successively charge the battery packs with the other charging circuit until the fully-charge signal is outputted thereby.

3. A battery cluster charger according to claim 2, wherein said charging switcher comprises:

a first line connected between one of said charging circuits and the battery pack corresponding thereto;

a first relay contact connected in said first line;

a second line connected between the other of said charging circuits and the battery pack corresponding thereto;

a second relay contact connected in said second line;

a third line interconnecting said first line and said second line; and a third relay contact connected in said third line.

4. A battery cluster charger according to claim 3, wherein said control circuit comprises means responsive to the failure signal from said one of the charging circuits and the full-charge signal from said other charging circuits, for opening one of said first and second relay contacts which is connected to said other charging circuits, and closing said third relay contact upon elapse of a predetermined time after said one of said first and second relay contacts is opened.

5. A battery cluster charger according to claim 1, wherein said charging switcher comprises:

a first line connected between one of said charging circuits and the battery pack corresponding thereto;

a first relay contact connected in said first line;

a second line connected between the other of said charging circuits and the battery pack corresponding thereto;

a second relay contact connected in said second line;

a third line interconnecting said first line and said second line; and a third relay contact connect in said third line.

6. A battery cluster charger according to claim 5, wherein said control circuit comprises means responsive to the failure signal from said one of the charging circuits and the full-charge signal from said other charging circuits, for opening one of said first and second relay contacts which is connected to said other charging circuits, and closing said third relay contact upon elapse of a predetermined time after said one of said first and second relay contacts is opened.

* * * * *